United States Patent [19]

Copp

[11] Patent Number: 4,711,411
[45] Date of Patent: Dec. 8, 1987

[54] AIRCREW HEADGEAR EJECTION MEANS

[75] Inventor: Warren K. Copp, Fleet, England

[73] Assignee: The Secretary of State for Defence in Her Majesty's Government of the United Kingdom of Great Britain and Northern Ireland, London, England

[21] Appl. No.: 922,881

[22] Filed: Oct. 24, 1986

[30] Foreign Application Priority Data

Oct. 25, 1985 [GB] United Kingdom ............... 8526386

[51] Int. Cl.⁴ .............................................. B64D 25/00
[52] U.S. Cl. ................................ 244/1 R; 244/122 A; 244/118.5; 33/262; 350/547
[58] Field of Search ............ 244/118.5, 122 R, 122 A, 244/122 AG, 121, 122 AE, 122 B, 1 R; 33/262, 252, 263; 350/547, 549, 145, 638; 2/6, 422; 128/207.11, 206.27, 206.21

[56] References Cited

U.S. PATENT DOCUMENTS

| | | | |
|---|---|---|---|
| 2,649,019 | 8/1953 | Harfline et al. | 350/547 |
| 3,051,047 | 8/1962 | Fieux | 33/262 |
| 3,267,210 | 7/1966 | Shapiro et al. | 33/262 |
| 4,486,955 | 12/1984 | Fisher et al. | 33/262 |
| 4,651,951 | 3/1987 | McFarlane | 244/1 R |

Primary Examiner—Galen Barefoot
Attorney, Agent, or Firm—Stevens, Davis, Miller & Mosher

[57] ABSTRACT

An apparatus for ejecting an aircrewmans helmet-mounted electro-optical equipment from an aircraft cockpit comprising an arm having a first end pivotally mounted at a position behind an aircrewmans ejection seat, a second end of the arm having on it a line reel-in apparatus and a flexible line depending therefrom, the flexible line attachable to helmet mounted electro-optical equipment, a guide and damper connecting the arm to the ejection seat, upon operation of the ejection seat the electro-optical equipment being detached from the helmet, the ejection seat rising in the cockpit and causing rotation of the arm about the pivot point, the line reel-in apparatus locking to prevent the line extending and the electro-optical equipemnt being ejected from the cockpit into the airstream by rotation of the arm prior to the ejection seat leaving the cockpit.

9 Claims, 3 Drawing Figures

AIRCREW HEADGEAR EJECTION MEANS

The present invention relates to aircrew headgear. It is particularly concerned with equipment such as optical equipment mounted on a protective helmet and the detachment thereof from the helmet upon operation of an ejection seat.

When optical equipment, for example, is mounted on aircrew protective headgear, it is usually to the fore thereof. If it were to remain attached to the protective helmet during ejection of the aircrew from an aircraft loads are likely to be imposed upon the aircrewman which could be unacceptable or at worst fatal. However it is also important for the equipment not to be jettisoned so freely that a risk arises of injury to the aircrewman or any colleague and that their vital equipment is not damaged.

The present invention provides means for controlled jettisoning of the equipment from the cockpit whilst restraining the equipment after detachment from the headgear so as to minimise the risk of injury or damage to essential personal equipment.

By means of the present invention, any helmet-mounted equipment can be automatically and rapidly removed by the operation of the ejection seat and this invention accordingly consists of apparatus for ejection of aircrew helmet-mounted equipment from an aircraft cockpit, comprising an ejector arm engageable with an airman's ejection seat and having a first end pivotally mountable behind the seat, and a flexible linkage for attching the helmet-mounted equipment to the second end of the ejector arm, so that in operation of the ejection seat, the arm is rotated about its pivot by upward movement of the ejection seat so that the equipment is detached from the airman's helmet and ejected from the cockpit by the rotating arm.

According to a second aspect of the present invention the ejector arm is mounted in the cokpit and offset to the centre line of the aircrewmans seat.

Advantageously the ejector arm is offset to one side of the seat and arranged to cross the head of the seat so that upon rotation of the arm, an arc is described which provides a trajectory which will jettison the equipment to one side of the aircraft, so that its path is not coincident with that of the escaping crew member.

According to a further aspect of the present invention the ejector arm is provided at its free end with an inertia reel-in device adapted to receive the line connecting the helmet-mounted equipment when the line is not under tension and to lock and prevent the line feeding out under conditions of high loading.

The inertia reel-in device may be conveniently provided to prevent the line connecting the ejector arm to the optical equipment from becoming excessively long with a consequent risk of entanglement and yet still allow the aircrewman a considerable amount of freedom of helmet movement.

According to a further aspect of the present invention the second end of the ejector arm is provided with a telescopic portion located coaxially with the end of the ejector arm, the telescopic portion being connectable at its free end to an inertia reel-in assembly, and the telescopic portion being extendable on ejection.

The telescopic portion of the ejector arm is advantageous in that the arm in its shorter length does not unduly restrict movement of the aircrewman and when extended on ejection it will take the jettisoned equipment clear of the aircrewman in a forward direction prior to its ejection from the cockpit.

According to a further aspect of the present invention there is provided an ejector arm having a hinge point along its length, to facilitate access to the cockpit for the entering or exiting crewman.

The hinge is arranged to hinge upwardly or sideways but in such manner that in the event of an emergency evacuation the arm would remain straight.

By way of example, two embodiments of the invention will now be described with reference to the accompanying drawings of which:

Figure 1:
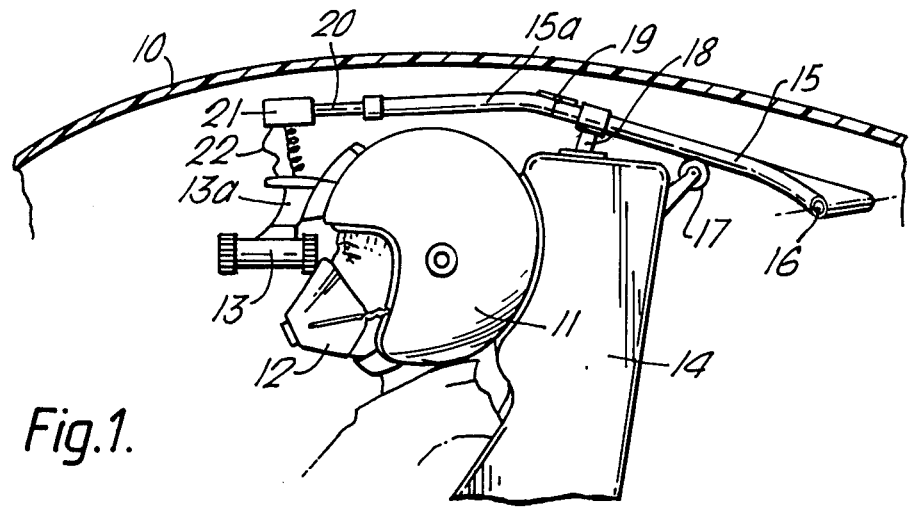
FIG. 1 shows a side view of the ejector arm arrangement, according to one embodiment.
Figure 2:
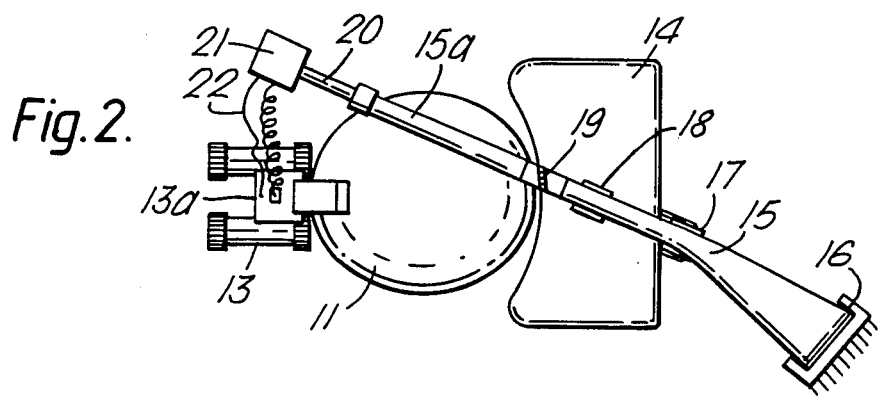
FIG. 2 shows a plan view of said ejector arm arrangement.

FIGS. 1 and 2 show an aircrewman seated in an aircraft cockpit with the cockpit canopy 10 in the closed position. The aircrewman is wearing a protective helmet 11 and oronasal mask 12, and in front of his eyes is a piece of helmet-mounted optical equipment 13, detachably connected to the helmet by clip assembly 13a. The aircrewman is seated in an ejection seat, of which only the head box 14 is shown. An ejector arm 15 is pivotally mounted to the airframe at a point behind the ejection seat. The pivot 16 is mounted so that its axis is inclined with respect to the roll and pitch axes of the aircraft. The ejector arm depends from the pivot point and passes over the top of the head box 14 of the ejector seat to terminate at a positin above the aircrewmans head. The under surface of the ejection arm 15 is acted upon by a roller 17 mounted on the head box of the ejection seat. The arm is also supported by a damper assembly 18 to hold the arm in place and minimize movements caused by vibrations. The arm is hinged near its midpoint. The hinge 19 is arranged to allow rotation of the arm in either an upward and/or outward direction to permit improved access to the cockpit. At its free end the arm has a telescopic segment 20, located coaxially with the ejection arm 15. The free end of the telescopic segment carries an inertia reel-in assembly 21. The optical equipment mounting bracket 13a is attached by a line 22 to the inertia reel-in assembly 21. If the helmet-mounted equipment is some form of electro-optical equipment, electrical and/or optical cables may feed power or data to and from the bracket 13a to the reel-in device 21. The ejector arm 15 is contoured so as to pass as closely as possible to the cockpit canopy 10 thereby enabling the pilot to sit high in the cockpit.

In routine operation the helmet-mounted equipment 13 will be attached to the inertia reel-in device 21 by line 22. The device permits the aircrewman to move his head freely whilst the helmet-mounted equipment is retained by a line 22 connected to the inertia reel-in device. In the event of any particularly strong inertial forces being encountered the device will lock and prevent the line paying out any further. Normally the telescopic portion of the arm 20 will not be deployed; it is only here shown deployed for illustrative purposes.

To gain access to the cockpit the cockpit canopy 10 must first be opened and the outer portion 15a of the ejector arm may then be hinged back and upwards to improve access to the aircrewmans seat. Once seated the hinged arm may be lowered to its normal position. Any helmet-mounted optical equipment may then be attached to the line depending from the inertia reel-in device. The aircrewman may then freely move his head with the retaining line attached. It has been found to be convenient to provide electrical power for any helmet-mounted electrical or electro-optical equipment by use of a flexible cable also depending from the inertia reel-in device. This is advantageous because it removes the need for batteries to be checked or replaced prior to each flight. At the end of each flight the helmet mounted-optical equipment may be detached from the line, the outer portion of the arm rotated about its hinge 19 to allow the aircrewman to exit from the cockpit.

Figure 3:
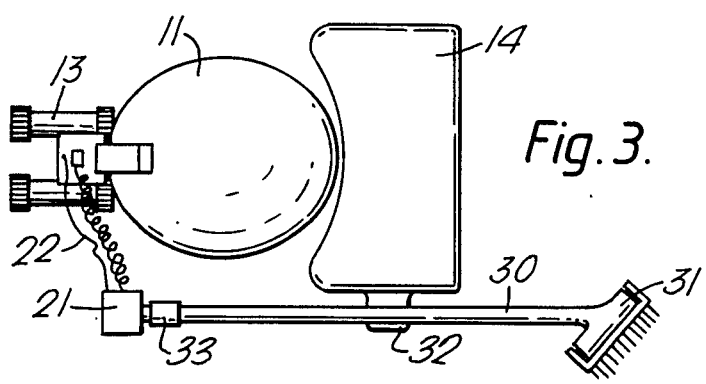
FIG. 3 shows an alternative embodiment of the invention.

In an alternative embodiment of the invention shown in FIG. 3 the ejector arm 30 is hinged about a pivot 31 where axis is offset from the roll and pitch axes of the aircraft as before. The ejector arm 30 extends forwards from the pivot 31 past the side of the ejection seat head box 14. The ejector arm is supported on a bracket 32 extending from the side of the seat. The bracket may be provided with a roller (not shown) on its upper surface to enable the arm to be moved more easily by the seat as it commences its ejection sequence. The arm extends to a position about level with the aircrewmans helmet 11 and is also provided with a telescopically extending portion 33 similar to that described in the other embodiment. Attached to the free end of the arm remote from the pivot 31 is an inertia reel-in assembly 21 containing cable means 22 attachable to helmet-mounted optical equipment 13.

A particular advantage of the arm passing along the side of the ejection seat head box 14 is that the arm will not present a significant obstruction to normal entry and exit from the cockpit, and as a consequence it is not necessary to provide a hinge point along the length of the arm.

In the event that an emergency evacuation of the aircraft is necessary the aircrewman will initiate the ejection seat operation. In normal operation the sequence commences with the shattering and removal of the canopy 10. The path is then clear for the ejection seat to exit from the aircraft taking the aircrewman with it.

In the embodiment of the invention shown in FIG. 3, the modified sequence is as follows. At the same time as the canopy is shattered or very shortly afterwards the helmet-mounted optical equipment 13 is separated from the helmet by use of either an electrical, pneumatic or mechanical separation means. The separation means are arranged to project the equipment forward and away from the helmet. The telescopic portion 33 is also extended by a different pneumatic, electrical or mechanical means (not shown) triggered by the ejection seat timing mechanism. These extension means will normally be contained in or mounted on the ejector arm 30 and the rapid extension of the telescopic portion 33 causes the inertia reel-in assembly to lock, so that as the arm is extended it will pull the optical equipment 13 away from the aircrewman's helmet. By this time the optical equipment will be separatd from the helmet 11, thus it is removed away from the aircrewman in a direction not likely to cause injury. Once the telescopic portion 33 is fully extended the ejection seat will begin to rise out of the cockpit. In so doing it will cause the ejector arm 30 to rotate about its pivot 31. To facilitate this movement and ensure smooth operation the roller and bracket assembly it attached securely to the head box of the ejection seat. The support bracket 32 is intended to provide a guide and support during routine operaion of the seat but could additionally be fitted with a roller or other aid to assist smooth and rapid rotation of the arm.

In either embodiment, the ejection seat rises and a very rapid rotation of the ejector arm 15 about its pivot point will ensue by virtue of the mechanical advantage of the system, thereby projecting the optical equipment, supported on the end of a line depending from the inertia reel-in apparatus, clear of the cockpit and ejecting aircrewman so that the aircrewman may eject in safety. Once clear of the cockpit and in the airstream the line securing the jettisoned equipment to the inertia reel-in device will probably fracture due to the very high loadings and the equipment will fall freely away. The offset and pivot angle will anyway ensure that the jettisoned equipment follows a different path from that of the ejection seat and the particular arrangement of this apparatus ensures that the helmet-mounted equipment will be jettisoned before the aircrewman ejects from the cockpit.

I claim:

1. Apparatus for ejection of aircrew helmet-mounted equipment from an aircraft cockpit, comprising an ejector arm engageable with an airman's ejection seat and having a first end pivotally mountable behind the seat, and a flexible linkage for attaching the helmet-mounted equipment to the second end of the ejector arm, so that in operation of the ejection seat, the arm is rotated about its pivot by upward movement of the ejection seat so that the equipment is detached from the airman's helmet and ejected from the cockpit by the rotating arm.

2. Apparatus according to claim 1 in which the first end of the ejector arm is pivotally mounted at a position in the cockpit offset from the centreline of the ejection seat.

3. Apparatus according to claims 1 or 2 in which the second end of the ejector arm supports an inertia reel-in assembly adapted to receive the line connecting the helmet-mounted equipment when no tension is applied to the line and to lock under conditions of high loading.

4. Apparatus according to claim 3 having an extensible telescopic portion mounted on the second end of the ejector arm in which the telescopic portion carries the inertia reel-in assembly and is extendable on operation of the ejection seat.

5. Apparatus according to claim 1 in which the ejector arm is hinged at a point along its length to facilitate access to the cockpit.

6. Apparatus according to claim 1 in which the pivot axis of the ejector arm is inclined with respect to the pitch and roll axes of the aircraft.

7. Apparatus according to claim 1 and further including guide means and damper means retaining the arm against the ejection seat.

8. Apparatus according to claim 1 in which the second end of the flexible arm and the helmet-mounted equipment are connected by cables adapted for the transmission of electricity.

9. Apparatus according to claim 1 in which the second end of the flexible arm and the helmet-mounted equipment are connected by cables adapted for transmission of light.

* * * * *